Aug. 20, 1968  H. LOCHMANN ET AL  3,398,082
ELECTROSTATIC FILTERING OF IMPURITIES FROM LIQUIDS
Filed Feb. 7, 1966
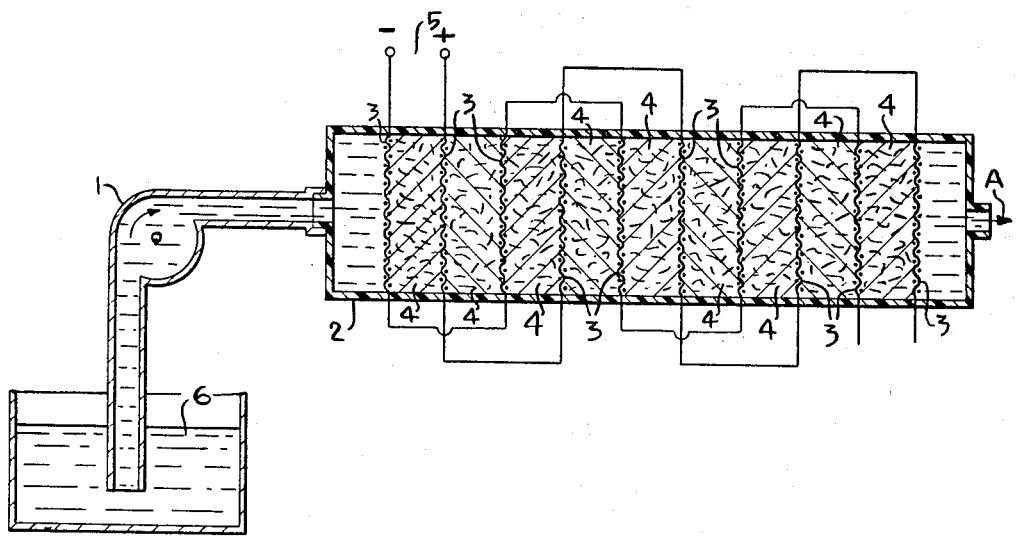
INVENTORS:
HELMUT LOCHMANN
& KARL QUENZER,
THEIR ATTORNEY.

3,398,082
ELECTROSTATIC FILTERING OF IMPURITIES FROM LIQUIDS
Helmut Lochmann, Singen, Hohentwiel, and Karl Quenzer, Hilzingen, Hegau, Germany, assignors to Swiss Aluminium Ltd., Chippis, Switzerland, a corporation of Switzerland
Filed Feb. 7, 1966, Ser. No. 525,763
Claims priority, application Switzerland, Feb. 10, 1965, 1,777/65
1 Claim. (Cl. 204—302)

ABSTRACT OF THE DISCLOSURE

Filtering device to remove from dielectric liquids impurities particles electrostatically. The liquid passes through a plurality of perforated electrodes that are fed from a source of direct electric current; positively and negatively charged electrodes alternate, and all the electrodes of the same polarity are connected in series so that the voltage drops in the flow direction.

---

The invention relates to the filtering of impurities from liquids, and releates more particularly to the electrostatic filtering of this type.

In many instances the purely mechanical filtering of impurities from liquids has been found to be unsatisfactory, as mechanical filtering systems for liquids heretofore used do not filter out the finer particles from the liquid.

It has previously been proposed to cleanse liquids electrostatically by conducting the liquid between two parallel plate electrodes that generate a field that is at right angles to the direction of the flow of the liquid. The electrodes are connected to a high voltage source of direct electric current for generating the aforesaid field. The impurities travel in the electrostatic field either to the anode or to the cathode, depending on the charge, and are discharged thereunto. There will thus remain two layers in the flowing liquid, namely a clean layer which is substantially free from impurities, and a partially cleansed intermediate layer that is disposed between the clean layer and the impurities discharged onto the electrode. The intermediate layer is insufficiently cleansed so that it contains some impurities, requiring that the cleansing must be repeated several times. Furthermore, there is always the danger that there may be an intermixing between the cleansed and the uncleansed liquid layers.

It is accordingly among the principal objects of the invention to provide means for filtering finely divided impurities from a liquid, removing from the liquid even the finest suspended particles.

It is another object of the invention to provide for such filtering electrostatically, guiding the flow of the liquid stream in the direction of the electrostatic field.

It is a further object of the invention to provide for a filtering device that includes perforated plate-like electrodes that extend at right angles to the direction of flow in a stream of the liquid to be filtered and are interconnected to a source of direct electric current for generating an electrostatic field to filter the impurities.

It is still another object of the invention to provide for the filtering of lubricating oil in a machine lubricating circuit in accordance with the aforesaid filtering device.

It is still a further object of the invention to provide such an electrostatic filtering device in which the liquid is confined by a conduit structure that is composed of electrically insulating material.

It is yet another object of the invention to provide for several pairs of such electrodes, with the respective plates of each pair electrically interconnected in series.

It is yet a further object of the invention to provide for porous intermediate filter layers between each two of the aforesaid electrodes.

Further objects and advantages of the invention will be set forth in part in the following specification and in part will be obvious therefrom without being specifically referred to, the same being realized and attained as pointed out in the claim hereof.

With the above and other objects of the invention in view, the invention consists in the novel methods, construction, arrangement and combination of various devices, elements and parts, as set forth in the claims hereof, one embodiment of the same being illustrated in the accompanying drawings and described in the specification.

For a fuller understanding of the nature and objects of the invention, reference should be had to the following detailed description, taken in connection with the accompanying drawings in which the single view is a longitudinal vertical sectional view of a filtering device in accordance with an embodiment of the invention.

The liquid 6 to be cleaned, is propelled by a pump 1 into a conduit structure, such as a tube 2. The tube is preferably made of electrically insulating material, such as plastic.

The tube 2 defines on the interior a conduit chamber in which there are arranged a plurality of electrodes 3. The electrodes 3 must be electrically insulated from the tube 2; thus, where the tube 2 is not made of electrically insulating material, means (not shown) would have to be provided for electrically insulating the electrodes 3 from the walls of the tube 2. Each electrode 3 is plate-like, and extends at right angles to the direction A of the flow of the liquid 6 in the tube 2. Each electrode 3 extends throughout the cross section of the tube 2 and is provided with perforations for passing the liquid 6.

In accordance with a preferred embodiment, the electrodes 3 may be plates with holes, or plates in grid form, or in the form of fine-meshed netting, and are composed of metal that is resistant against the liquid to be cleansed, and may, for instance, be made of copper or brass.

The first two electrodes 3 are connected to the poles of a source 5 of direct electric current. The remaining electrodes 3 are so connected in series that all second electrodes are interconnected. Thus, each second electrode will have substantially the same electric potential. As each electrode has a resistance, however small, of its own, there is achieved by this arrangement that there will be a voltage drop from each electrode to the next connected thereto in series. This, in turn, brings about that the electrostatic field which is generated between the electrodes will, when the proper voltage is applied, provide for a travel of the particles in the direction of flow of the liquid, and the particles will be arrested at the upstream positively charged surfaces of the electrodes.

The aforesaid proper voltage is within the range from about 5 kv. to about 50 kv., preferably from about 8 kv. to about 25 kv.

The quantity of the electrodes 3 to be used depends primarily on the length of the tube 2, as well as on the distance between the individual electrodes which latter, in turn, depends on the voltage applied. The greater the quantity of succeeding electrodes, the better will be the cleansing effect. On the other hand, the distance between the individual electrodes must be sufficiently large so as to avoid arcing between the individual electrodes.

In accordance with a preferred embodiment, porous filter layers or plates 4 are arranged between the electrodes 3. The layers 4 extend throughout the cross section of the tube, and are composed of paper, textile fibers, asbestos fibers, or fibers of synthetic resin.

The impurity particles will be discharged at the electrodes, as well as along the surfaces of the filter plates that are disposed adjacent the electrodes. The discharge of the particles on the filter plates 4 occurs, however, not because of any mechanical filter action of the plates 4, but only due to the action of the electrostatic field.

The instant invention is particularly suitable for the cleansing of lubricating oils, for instance of oil used in rolling mills during the rolling of metal. These rolling-mill oils are particularly soiled by the wear of the rolls. This abrasion has an adverse effect on the quality of the surfaces of the metal pieces to be rolled, and must therefore be removed from the rolling-mill oil. Ordinary filters, it has been found, however, are not capable of cleansing the rolling-mill oil of these impurities satisfactorily. In accordance with the instant invention, though, there is achieved a better cleansing effect than with mechanical filters alone. For this purpose, a filtering device in accordance with the instant invention is being built into the lubricating circuit of the rolling-mill oil of the rolling mill, so that the impurities may be removed from the oil.

The invention lends itself, however, for example, also to being built into the lubricating circuit of other machinery.

EXAMPLE

Ten electrodes 3 were mounted in a plastic tube having a diameter of 75 mm. The electrodes were composed of fine-meshed copper net, and the electrodes were spaced apart from each other for a distance of 30 mm., with filter layers 4 composed of felt wool disposed therebetween. With a pump, there were conveyed through the device about 3 liters per minute of rolling-mill oil that contained impurities, and which was used to lubricate an aluminum foil rolling mill. The voltage applied was 20 kv. During one run, the impurities content of the oil showed a lowering of from .38% to .33%. Without the application of an electrostatic field, however, no filtering effect was noticeable. After fifteen runs the impurities content of the oil was lowered to .05%.

At first impression, this filtering effect would appear to be small. It must be considered, however, that under practical working conditions, the operator does not wait until the oil has been saturated with the highest permissive impurities content. The oil, instead, is continuously conducted through the filtering device. It has been found that with the instant invention used in this manner, the rolling-mill oil could be used for a good deal longer than with filtering devices of the prior art.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In a filtering device, for use in filtering from a liquid finely divided impurities particles suspended therein, the combination of a conduit structure comprising a tube composed of electrically insulating material confining the liquid to flow in a predetermined stream, a plurality of perforated plate electrodes fed from a source of direct electric current and disposed within, though electrically insulated from, said tube of said conduit structure, said plate electrodes extending transverse of the direction of flow of said stream, said electrodes being disposed in substantially parallel planes spaced from each other, alternate among said electrodes being interconnected electrically in series, and layers of porous filter material disposed between each pair of electrodes.

References Cited

UNITED STATES PATENTS

| 1,831,075 | 11/1931 | Neeley | 210—223 |
| 820,482 | 5/1906 | Dion | 204—276 X |
| 1,507,687 | 9/1924 | Schmidt | 55—138 X |
| 1,837,519 | 12/1931 | Bleecker. | |
| 2,295,152 | 9/1942 | Bennett | 55—138 X |
| 3,111,398 | 11/1963 | Jones | 209—127 X |
| 3,324,026 | 6/1967 | Waterman et al. | 204—302 |

FOREIGN PATENTS 698,900   10/1953   Great Britain.

OTHER REFERENCES

German application, I 6,359, Prietl, November 1956.

SAMIH N. ZAHARNA, *Primary Examiner.*